3,109,012
METHOD OF PRODUCING ORGANO-SILICON COMPOUNDS AND PRODUCTS THEREFROM

Gerd Rossmy, Altendorf (Ruhr), and Jakob Wassermeyer, Dusseldorf, Germany, assignors to Th. Goldschmidt A.-G., Essen, Germany
No Drawing. Filed June 10, 1960, Ser. No. 35,140
Claims priority, application Germany June 12, 1959
8 Claims. (Cl. 260—448.2)

This invention relates to a method of producing organo-silicon compounds having sulphate-ester groups bound to the silicon stems by carbon bonds and to salts of such organo-silicon compounds.

More particularly, the invention relates to reaction products of organo-substituted silicon compounds with sulfuric acid. In addition, the invention is concerned with compositions containing the improved products.

In recent years several methods have been proposed for breaking down the inert character of silicones by introducing organo-functional groups into the same. Water-soluble silicones have inter alia been thus prepared.

It has heretofore been known that water-soluble sulfuric acid esters can be obtained by sulphatization. For instance, lauryl sulphate is produced in this way from lauryl alcohol on an industrial scale. However, it could not be expected that organo-silicon compounds would be amenable to such a reaction, because it is known that sulfuric acid and its derivatives break the Si—O—Si bond with the formation of hydrolyzable silyl sulphates.

One of the objects of the present invention is to provide water-soluble organo-silicon compounds.

Another object of the invention is to provide a method by which such water-soluble organo-silicon compounds may be prepared.

Other objects of the invention are to provide compositions of commercial utility capable of being used as a dielectric material and/or as an insulating material; to provide compositions for use in impregnating textiles, leathers, paper, glass, wood, brickwork, etc. for rendering the same heat and moisture resistant; and to provide compositions having emulsifying and detergent properties.

Still other objects and advantages of the present invention will be apparent from the following description.

It has now been found that heat resistant, hydrophilic organo-silicon compounds which can be emulsified with or dissolved in water can be obtained by reacting organo-silicon compounds having organically bound hydroxyl and/or acyloxy groups with sulfuric acid or its anhydride or its derivatives at a temperature of up to 180° C. The reaction can be performed in the presence of a solvent, and with especial advantage an inert gas may be conducted through the reaction mixture.

It is an outstanding feature of the method proposed by the invention that it has an extremely wide range of possible modifications. The desired sulphate esters may be produced from monomeric silanes as will be described hereinafter in Section 1. These reaction products will be hereinafter referred to as "sulfuric acid esters of organo-silicon alcohols." Alternatively, use may be made of polymeric organo-silicon compounds as starting materials as hereinafter described in Section II, so that after sulphatization, the sulfuric acid ester groups will be built into organo-silicon compounds which are already polymerized. On the other hand, organo-silicon polymers containing sulphate ester groups may be obtained from the sulfuric acid esters of organo-silicon alcohols described in Section I by incorporating them in siloxanes by an equilibrating reaction of a kind which will be hereinafter described in Section III. These compounds will be hereinafter referred to as "equilibrates."

The reaction products obtained by sulphatization of organo-silicon compounds containing organically bound hydroxyl and/or acyloxy groups, possibly equilibrated with siloxanes, are hydrolyzed in water or aqueous solutions with the formation of the corresponding acid sulfuric acid esters. This hydrolysis and the neutralization of the resultant acid sulfuric acid esters will be hereinafter described in Section IV.

It is frequently desirable to submit the products described in Sections I, II and III to further processing for the formation of neutral compounds before their dissolution in water. The required reaction with organic hydroxyl compounds and bases will be hereinafter described in Section V.

The sum of the reactions or procedural steps described in these five sections provides the novel products which form the subject matter of the invention.

SECTION I

For the purpose of producing organo-silicon compounds having sulphate ester groups attached to the silicon atoms by carbon bonds, monomeric organo-functional halo- or alkoxy silanes or mixtures thereof can be used as starting materials. These organo-silanes can be represented by the general formula:

$$R_xY_ySi(MOCOR)_{4-(x+y)} \quad \text{(Formula A)}$$

wherein R represents a monovalent hydrocarbon radical or combinations of such radicals, such as lower alkyl radicals up to $C_4$, such as a methyl, ethyl, isopropyl, 4-chlorobutyl, or a cyclohexyl radical, or phenyl radical; M represents divalent hydrocarbon radicals or combinations of such radicals; the terminal groups of said divalent hydrocarbon radicals being separated by at least one further C-atom, such as n-propylene, 3-chloropropylene, 1,3-n-butylene, isobutylene; Y represents a halogen atom or an alkoxy group, such as Cl, Br, I, —$OCH_3$, —$OC_2H_5$, —$OC_3H_6$; and $x$ and $y$ represent numbers from 0 to 3.

Compounds of this kind include, for instance, γ-acetoxy propyl methyl dichlorosilane, γ-propionoxy propyl tricholorosilane, δ-acetoxy butyl ethyl dichlorosilane.

If these silanes are reacted with sulfuric acid, the Y-groups will react, with the evolution of HY, such as hydrogen halide, and the MOCOR— groups will react, with the liberation of the corresponding carboxylic acids and the formation of the acid sulphate.

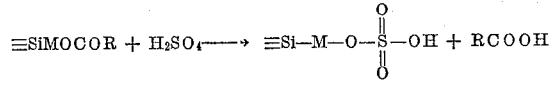

(Formula B)

The application of heat facilitates the reaction.

If Y is an alkoxy residue the sulfuric acid will likewise react with the resulting alcohol HY and form a corresponding acid sulphate ester. The separation of the carboxylic acid is greatly facilitated by the presence of a Friedel-Crafts catalyst.

The reaction is even more advantageously carried out if use is made of halogen derivatives of sulfuric acid such as chlorosulphonic acid as reactant for introducing the sulphate moiety. The reaction is then guided specifically for instance by reaction of the hydroxyl groups of the chlorosulphonic acid with the halogen of the halo-silane with the liberation of hydrogen halide, whereas the acyloxy group of the silane reacts at elevated temperatures (30–180° C.) with the chlorine of the chlorosulphonic acid, liberating the corresponding carboxylic halide and forming the —$MOSO_3H$— group which in turn can react with ≡SiX with the liberation of HX and the formation of —$MOSO_3Si$≡. The reaction products readily dissolve in water, hydrolysis splitting off any silyl sulphate groups which may be present as well as unreacted silicon halides or silicon alkoxy groups.

In the event of $y$ equal$\geq 4-(x+y)$, these reaction products (disregarding secondary reactions and assuming that the reaction is complete) can in principle be defined by the general formula

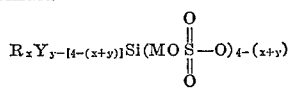

If $y$ equal$<4-(x+y)$, then

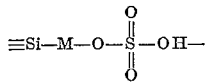

groups will also arise, and the general formula of the reaction product produced will be

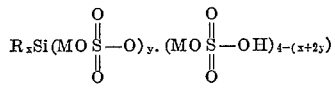

For the sake of convenience such substances will be hereinafter referred to as "sulfuric acid esters of organo-silicon alcohols."

For instance, if chlorosulphonic acid is reacted with γ-acetoxy propyl methyl dichlorosilane in equimolar proportions at temperatures of from about 30–140° C., a clear slightly viscous oil of the composition

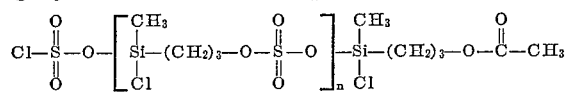

will be obtained with the simultaneous release of hydrogen chloride and acetyl chloride.

Disregarding secondary reactions, the value of $n$ can be calculated from the yield of acetyl chloride. If this is 85%, which yield can be readily obtained if water is carefully excluded from the reaction, $n$ will be, for instance, about 5.7.

The evolution of the acyl halide can be facilitated by the application of reduced pressure and/or by the use of an inert gas which is conducted through the reaction mixture. Any secondary reactions can thus be suppressed.

In this reaction branched organo-silicon compounds may also form but these cannot, of course, be represented by the above schematic formula, nor does the formula show any secondary products which may arise.

SECTION II

In accordance with another mode of performing the method of the invention, polymeric siloxanes may be used as starting materials which have been obtained by hydrolysis from the above mentioned acyloxyalkyl silicon halides or alkoxides, and to which other alkyl-(aryl)-silicon halides may be added. Such siloxanes may be described by the following general formula:

$[R_nSiO_{2-1/2n}]_p[R_nSi(MOH)_mO_{2-1/2(n+m)}]_q$
$[R_nSi(MOCOR)_mO_{2-1/2(n+m)}]_r$   (Formula C)

In this formula R and M have the above defined meanings, $n$ and $m$ have values between 0 and 3, and $p$, $q$ and $r$ may have any values, preferably between 0 and 500. The ratio $q$ to $r$ can be arbitrarily increased by saponification or by a catalyzed alkaline re-esterification performed after hydrolysis until possibly all the ester groups have disappeared. The formation of the organo silicon sulphate esters in the said reaction proceeds for instance on the lines of the following equations:

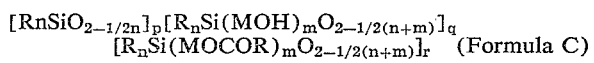

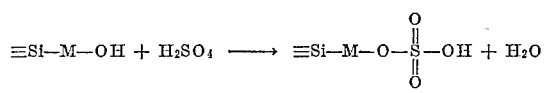

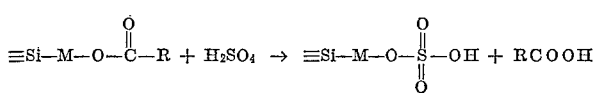

The latter reaction can be considerably accelerated if the resultant carboxylic acid is continuously removed from the reaction mixture by distillation. Primarily formed silyl sulphates probably participate in the reaction, thus:

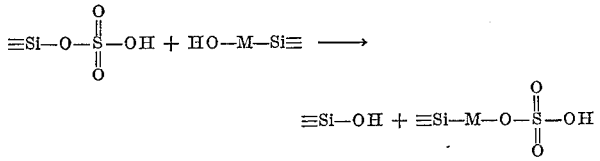

Alternatively the reaction can be performed with $SO_3$, preferably dissolved in an inert solvent or bound in a complex.

Chlorosulphonic acid and other derivatives of sulphuric acid, such as for instance amidosulphonic acids can also be employed. The sulphating agent may be used in excess quantities in relation to the organic hydroxyl or ester groups present in the polymeric siloxane.

SECTION III

A particular advantage of the above described method is that the reaction mixture arising in the sulphatization of the organo-silicon compounds of formula $R_xY_ySi(MOCOR)_{4-(x+y)}$   (Formula A)

can be directly and easily incorporated in other organo-siloxanes of the general formula

$R_nSiO_{2-1/2n}$ by simply mixing the silane with the said siloxane and possibly stirring until equilibrium is established. For the sake of convenience the reaction products thus obtained will be hereinafter referred to as "equilibrates." The sulphate groups in the reaction mixture which are bound to the organo-silicon moiety act as equilibrating catalysts. However, sulphuric acid may at the same time be added to the reaction mixture.

As will be exemplified for instance by the incorporation of organo-silicon sulphuric acid esters obtained from γ-acetoxy propyl methyl dichlorosilane and chloro-sulphonic acid in hexamethyl trisiloxane, the hydrophilic sulphate ester group

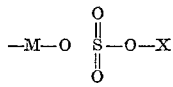

(wherein X=hydrogen or a substituted silyl radical) can thus be evenly distributed in any desired proportions between conventional hydrophobic siloxane units and the hydrophilic character of the siloxane obtained by the final hydrolysis can thus be finely graded as may be desired. However, relatively high molecular, tenacious highly cross-linked resinous substances which in the subsequent hydrolysis are not easy to deal with may likewise arise. This is partly due to the fact that the cyclic siloxane polymerizes in a secondary reaction. This can be avoided by using a siloxane for equilibration which has a chain length limited by trialkylsilyl groups, but this procedure simultaneously limits the chain length of the siloxane obtained in the final hydrolysis.

It has also been found that mobile liquid equilibrates which can be easily transformed into water-soluble siloxanes or into siloxanoles can be obtained by equilibrating the organo-silicon sulphuric acid esters with siloxanes of a molecular size limited by hydrolyzable groups. Such compounds are for instance γ,ω-chlorosiloxanes of the general formula:

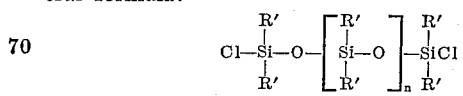

(R' represents a hydrogen atom, or a monovalent hydrocarbon radical such as an aryl, alkyl, alkaryl, or aralkyl radical or a combination thereof as, for instance, —CH₃, —$C_2H_5$, isopropyl, cyclohexyl, 4-chlorobutyl, 3-acetoxypropyl, phenyl, or naphthyl), or new compounds herein described of the general formula

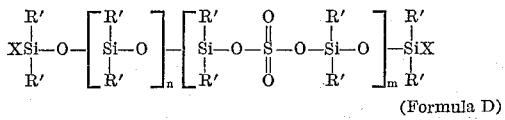

(Formula D)

wherein R' has the meaning defined above, and X represents a halogen atom or alkoxy group, such as Cl, Br, I, —$OCH_3$, —$OC_2H_5$, —$OC_3H_6$) or similar compounds having trifunctional silicon units, such as compounds of the general formula

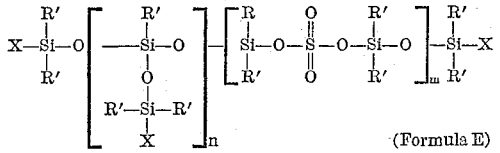

(Formula E)

(R' and X have the meanings defined above, $n$=any number, and preferably has a value of from 1 to 50 and $m$=any number, and preferably has a value of 0.01 to 3). This formula does not exhaust every structural possibility but should be sufficient to illustrate the type of compound desired.

The last mentioned classes of compounds have the further advantage that silyl sulphate groups give them an additional equilibrating effect.

By the incorporation in the above described "sulphuric acid esters of organo-silicon alcohols" of these siloxanes which are limited in chain length by hydrolyzable groups, compounds arise of, for instance, the following general structure:

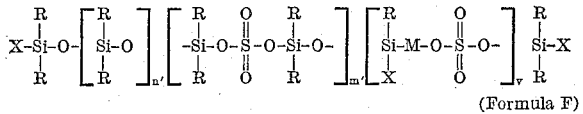

(Formula F)

(R and X have the meaning defined above, $n'$, $m$=any numbers preferably within the range for $n$ and $m$ given above, and $v$=any number, preferably 0.01 to 10).

Equilibration is most conveniently performed whilst stirring and with the application of elevated temperatures up to about 150° C. Equilibrates of any desired viscosity can be thus produced. For subsequent hydrolysis the mobile short chain compounds are particularly useful.

SECTION IV

When the "sulphuric acid esters of organo-silicon alcohols" according to the invention or the "equilibrates" which may have been obtained therefrom are mixed with water and hydrolyzed, splitting the SiX, SiY or Si—O—S bonds, they yield products which are water-soluble, emulsifiable or insoluble in water, according to the content of sulphated organo-functional hydroxyl groups in the siloxane. For hydrolysis it may be advisable to add to the water and/or to the mixture which is to be hydrolyzed an inert solvent, such as tetrahydrofurane, dioxane, ether, butanol, or toluene, as otherwise there is some risk of gel formation.

Hydrolysis may also be performed in the presence of other organo-silicon compounds containing hydrolyzable groups at the silicon atom, of the general formula $$R_xSiY_{4-x}$$

wherein R, y and x have the above defined meanings. Such compounds are, for instance, dimethyl dichlorosilane, diethyl dichlorosilane, methyl trichlorosilane, dimethylphenyl dichlorosilane. Co-condensation takes place in the reaction. The siloxanes obtained by hydrolysis, which contain acid

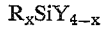

groups, may be stabilized against saponification by salt formation with an inorganic or organic base, the mineral acids liberated by hydrolysis being simultaneously neutralized. Hydrolysis of the reaction mixture may also be performed directly with a base in solution.

Ammoniacal water, solutions of ammonium or sodium carbonate, sodium bicarbonate and other alkaline salts, alkali metal hydroxides and other bases may be used for neutralization. Salts forming a buffer system, such as sodium acetate, are particularly suitable.

The separation of the water-soluble siloxanes from the hydrolyzed liquor can be advantageously performed, for instance, by salting them out with a neutral salt. Frequently the quantities of sulphate and halide which necessarily arise when neutralizing the sulphuric acid and hydrogen halide formed in hydrolysis may be sufficient for their separation. However, they may be separated from the inorganic sulphate salts for instance by precipitating them with $Ba(OH)_2$ or $Ca(OH)_2$ or by any of the conventional methods employed in the production of organic sulphate esters. Alternatively, the solution may be evaporated and the siloxane content obtained in pure form by extraction of the residue with an appropriate organic solvent, such as alcohol. However, for many purposes the separation of the inorganic salts will not be required.

SECTION V

It is often desirable that the products should form neutral solutions or nearly neutral solutions in water without special trouble or that in certain contemplated applications they should be neutral in non-aqueous systems.

Such compounds may be obtained if the above described sulphuric acid esters of organo-silicon alcohols or the equilibrated products which may be obtained therefrom are reacted with organic hydroxyl compounds and bases. Suitable hydroxyl compounds are, for instance, mono- or polyhydric aliphatic alcohols or phenols, such as ethanol, octanol, glycol, sugar, cellulose, polyethylene glycolmonoalkyl ether or phenol.

Bases which can be used include, for instance, ammonia, metal hydroxides or their alkoxy derivatives, such as sodium methylate, aliphatic and aromatic amines, and pyridine. Basic and hydroxyl compounds may be combined in one molecule, as is the case, for instance, in monoethanol amine, di- or tri-ethanolamine sodium methylate and similar compounds.

An appropriate procedure consists in mixing the silicon compounds with the hydroxyl compounds and in then adding the base in order to neutralize the liberated acid.

However, in many instances, in order to avoid the occurrence of undesirable re-esterification reactions, it has been found advisable to take steps for ensuring that a neutral or weakly alkaline reaction predominates.

This can be readily achieved by adding to the organo-silicon compound an equivalent mixture of hydroxyl compound and base, which is sufficient for neutralization (one base equivalent for each reactive OH— group) or by introducing the organo-silicon compound dropwise into a mixture of hydroxyl compound and base, in which case both the hydroxyl compound and the base may be present in excess quantities.

The salts obtained by the neutralization of the liberated acid can be easily separated from the organo-silicon reaction products by filtration.

It will be readily understood that a mixture of several hydroxyl compounds can be thus used, for instance, a mixture of a mono- and a polyhydric alcohol. It is also possible to replace a portion of the hydroxyl compound required for the reaction by water. This is of particular importance when reacting "equilibrates." If these "equilibrates" are reacted exclusively with monohydric alcohols a portion of the alkoxy siloxanes formed by the disintegration of the "equilibrates" will lack an organo-functional siloxane radical.

The linkage formed by water or polyhydric alcohols, such as glycol, permits higher molecular fragments, all of which now contain one or more organo-functional silicon radicals, to be produced. Alternatively, the linking of individual alkoxy siloxanes by means of water or polyhydric alcohol may be effected after performing a primary reaction with a mono-hydric alcohol, by heating the mixture of the reaction product with the calculated quantity of water or polyhydric alcohol (possibly in the presence of a catalyst of a kind known as such), driving out the liberated monohydric alcohol by distillation.

All the steps of the reaction which has been above described may likewise be performed in the presence of a solvent, tetrahydrofurane and dioxane having been found especially useful.

The reaction of the "sulphuric acid esters of organo-silicon alcohols" or of the "equilibrates" obtained therefrom with hydroxyl compounds $(ZOH)_n$ (Z represents a mono- or polyvalent radical or hydrogen, for instance $—CH_2$, $—CH_3$, $—C_2H_5$, $—C_3H_6—$, cyclohexyl, 2,4-dichlorobenzyl,

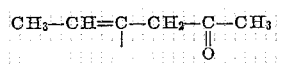

or phenyl; in the case of polyvalent organic hydroxyl compounds Z indicates the portion of the molecular structure which corresponds with one reactable OH— group; for example in the case of glycol $Z=CH_2$) is illustrated by the following equations. (In these equations the neutralization of the liberated acids is not represented.)

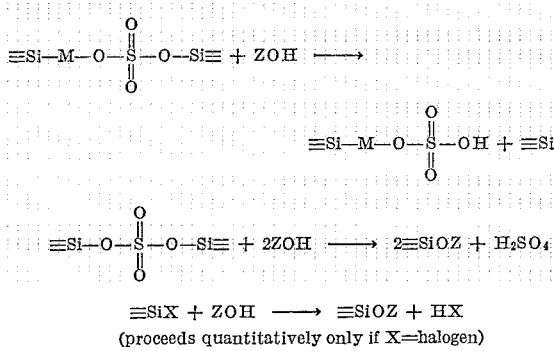

$\equiv SiX + ZOH \longrightarrow \equiv SiOZ + HX$
(proceeds quantitatively only if X=halogen)

The compounds which can be produced by this method are extremely numerous. Their properties can be systematically varied.

This may be illustated in the case of "sulphuric acid esters of organo-silicon alcohols." These compounds are for instance nearly ideally suited for building up surface-active substances. The products obtained by reaction with the hydroxyl compounds contain as a hydrophlic portion the $\equiv Si—M—O—SO_3H$ group which has been neutralized by a base, whereas the groups R, M, and Z serve as the hydrophobic portion.

By the suitable selection of R, M and Z the hydrophilic and hydrophobic characters of these substances can be balanced in any manner desired. The unit element principle of construction by the formation of silicon linkages explains why even very small Z residues (such as $C_3H_7—$ or $C_4H_9—$) can impart to the substance sufficient hydrophobic character to make it extremely surface-active and to cause it to foam considerably in aqueous solutions. The examples will illustrate this point more clearly.

The outstanding advantage of these surface-active substances when used as emulsifiers consists in that they can be easily broken down into fragments which are themselves not surface-active. This decomposition is brought about by the hydrolysis of the Si—OC bond by acidification, alkalinization, or by simply boiling with water; This properly is of incalculable value in the application of the substances according to the invention to the production of emulsions which impart hydrophobic properties or in their use for polymerization reactions of emulsified monomerics. As active detergents these substances are likewise of outstanding value because of their ready decomposition which permits foam formation in water wastes to be easily suppressed.

However, the reaction with the aforesaid hydroxyl compounds may envisage entirely different objects.

For instance, by forming linkages via the Si—O—C bonds, water-insoluble organic hydroxylic compounds can be solubilized, and they can be just as easily reseparated from their aqueous solutions. Such organic hydroxyl compounds are, for instance, cellulose, or cellulose ethers, or cellulose esters, and other higher molecular compounds. In the case of "equilibrates" produced from "sulphuric esters of organo-silicon alcohols" the reaction with hydroxyl compounds frequently envisages yet other objects. By virtue of the $R_nSiO_{2-1/2n}—$ groups contained therein these substances usually already have a sufficiently hydrophobic character to be surface-active in conjunction with the sulphate group in the organo-silicon bond. It is principally the object of the reaction with the hydroxyl compounds and bases to produce neutral water-soluble compounds, their advantage being their neutrality and the resultant ease with which they can be handled.

Conveniently, the hydroxyl compound which is used for this purpose is a short-chain aliphatic alcohol. It is frequently advisable to add a little water or a polyhydric alcohol to the lower aliphatic monovalent alcohol.

However (as already mentioned), the reaction with the monohydric alcohol may first be completed and condensation performed with the help of water or a polyhydric alcohol in the second stage. The reaction may be illustrated by reference to that of an "equilibrate" obtained as a reaction product from γ-acetoxy propyl methyl dichlorosilane and chlorosulphonic acid and a siloxane prepared from dimethyl dichlorosilane, water, and sulphuric acid, with ethanol, water and ethylamine.

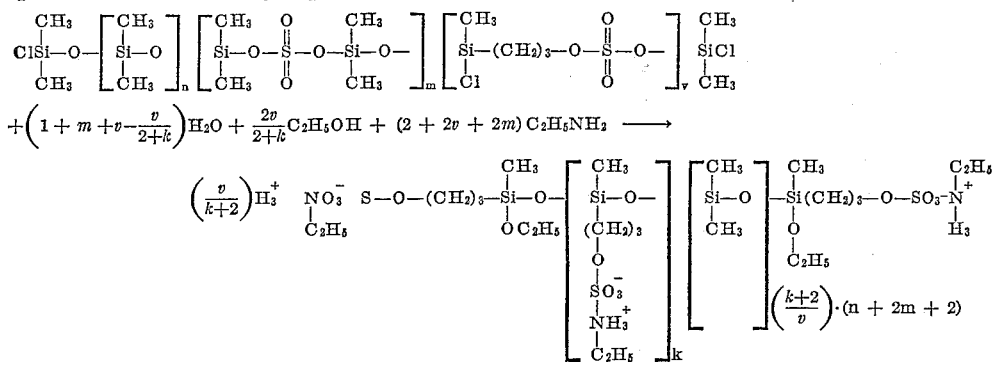

The indices $n$, $m$, $v$ and $k$ may be varied as desired. The formulae do not disclose every possible structural unit. However, they do correctly illustrate the general structure and the overall principle of the scheme.

The quantities of alcohol and water which should expediently be employed depend, among other factors, upon the values of the indices $m$, $n$ and $v$. A skilled person who is familiar with the problem will have no difficulty in selecting the same in a manner appropriate to the special case he has in mind after having read the explanations given above.

It has already been pointed out that the task performed by the water may alternatively be performed by polyvalent organic hydroxyl compounds.

Another possibility of improving the water-solubility of the reaction products consists in using strongly hydrophilic substances as hydroxyl compounds.

Such compounds include, for instance, glycerine and its derivatives, glycol and the polyethylene (propylene) glycol monoalkylethers.

This principle which has been known for some time in connection with pure alkylsiloxanes here serves for supporting the hydrophilic functions of the sulphate ester groups attached to the silicon by a carbon bond.

It is thus possible with a moderate expenditure of organo-functional units and with relatively few polyether units to bring, for instance, longer polysiloxane units into aqueous solution than would be possible by the exclusive application of one principle alone.

The applications of the novel siloxane compounds herein described are extremely numerous. The substances can be used, for instance, for impregnating and waterproofing textiles, leathers, paper, glass, wood, brickwork and so forth, possibly in combination with other organic resins, plastics, or their preliminary products. They can further be used as emulsifiers, especially for producing siloxane emulsions.

They also have satisfactory detergent properties which make them suitable for use as washing agents.

In order that those skilled in the art may familiarize themselves with the method of the present invention, the products which are obtainable therefrom and compositions in which such products may be employed, the invention will now be illustrated by the following examples, in which all parts and percentages are by weight unless stated otherwise.

*Example 1*

To 129 parts of γ-acetoxypropylmethyldichlorosilane, there were added 73.4 parts of dimethyldichlorosilane and 1.3 parts of trimethylchlorosilane. The resultant mixture was stirred into a solution comprising 87 parts of water and 350 parts of tetrahydrofurane. After the addition of another 500 parts of water, two layers were obtained, an aqueous and an oily phase, the latter being washed several times with aqueous ammonia and then dissolved in ethyl ether. After drying the resultant mass over sodium sulphate and evaporation of the ether, a jelly-like substance was obtained which was dissolved in 350 parts of ethyl alcohol. 0.5 part by weight of sodium was added to the solution as a catalyst for interchange of ester radicals. After the solution was allowed to stand for several hours, the ethylacetate and the ethanol were distilled off and the process repeated twice with the addition of further sodium. Thereafter the reaction mixture was washed and dried. A yield of 105 parts of a viscous liquid was obtained having an OH number of 275 and a saponification number of 28. To 25 parts of this viscous liquid there were added 19.8 parts of concentrated sulphuric acid, and the mixture was cold-stirred for three to four hours. The resultant homogeneous appearing reaction mixture, which readily dissolved in aqueous ammonia, formed a stable siloxane solution.

*Example 2*

To a suspension composed of 0.5 part of platinized charcoal (2% Pt) and 50 parts by weight of allylalcohol there were admixed, for a period of 2 hours, 46 parts of tetramethylcyclotetrasiloxane by stirring the reaction mixture at a temperature of 97° C. The determination of the Si—H groups showed a conversion rate of 97%. 20 parts of the reaction product freed from the catalyst were mixed with 33 parts of concentrated sulphuric acid and stirred vigorously for a period of 24 hours. A homogeneous reaction product was formed which was readily soluble in water. A neutralized aqueous solution of the same was found to be stable after storage for several weeks at room temperature.

*Example 3*

71.7 parts of γ-acetoxypropylmethyldichlorosilane were added to 42.8 parts of chlorosulphonic acid, and the mixture stirred at a temperature of 85° C for one hour. A vigorous stream of hydrogen chloride and acetyl chloride was formed, and 22 parts of acetyl chloride were separated. To 30 parts of the resultant reaction product consisting of a viscous oil which was water-soluble, there were admixed 37 parts of hexamethyltrisiloxane, the reaction mixture being maintained at a temperature of 25° C. for several hours with continued stirring. A pasty, homogeneous reaction product was formed, which was soluble in water. When an aqueous solution was neutralized with ammonia, it remained stable for several weeks when stored at room temperature.

*Example 4*

To 250 parts of γ-propionoxypropyltrichlorosilane there were admixed 115 parts of chlorosulphonic acid at a temperature of 90° C. and 190 mm. Hg for 2½ hours, the reaction being supported by passing through 15 litres of nitrogen per mol silane per hour. A vigorous stream of hydrogen chloride and propionyl chloride was formed and separated. The reaction product consists of 238 parts of a viscous oil which was readily soluble in water.

*Example 5*

To 243 parts of δ-acetoxybutylethyldichlorosilane there were admixed 116 parts of chlorosulphonic acid at a temperature of 75° C. and 300 mm. Hg for 2½ hours, the reaction being supported by passing through 10 litres of nitrogen per mol silane per hour. Hydrogen chloride and acetyl chloride formed by the reaction as a by-product were separated. The reaction product consists of 245 parts of a viscous oil which was readily soluble in water.

*Example 6*

116.5 parts of chlorosulphonic acid were added dropwise to 215 parts of γ-acetoxypropylmethyldichlorosilane while stirring and heating the mixture at a temperature of 55° C. The resultant reaction mixture was then further heated while stirring to 120° C. and the heating continued to about 130° C. while applying a vacuum, e.g., 10 inches Hg. Approximately 58 parts of acetyl chloride were produced together with hydrogen chloride which was absorbed in water. A slightly yellow colored viscous oil separated out and was recovered. When 14.2 parts of this viscous oil were mixed with 21.3 parts of α-ω-chlorosiloxane ($n=5.7$), and the resultant mixture was continuously stirred and allowed to react for several hours at 70 to 80° C., a clear, slightly viscous and homogeneous oily product was obtained.

200 parts of ammonia water (30% $NH_3$) were added, while stirring, to 22 parts by weight of this oil in a fine jet stream. After addition of 1 part by weight of ammonium chloride, 23 parts by weight of an oily organosilicon sulphate ester were separated out of the neutralized solution. The oily substance had a water content of about 33% by weight and was readily soluble in water. A 10% aqueous solution of this oily substance remained stable when stored at room temperature (20° C.) for several weeks.

*Example 7*

112 parts of the reaction product described in Example 6 and 214 parts of a siloxane obtained by reacting dimethyldichlorosilane with water and sulfuric acid and having the general Formula D given in the description in which $n=11.2$ and $m=0.67$ were mixed and heated to 120° C. while stirring the same. The resultant mixture became homogeneous after a short time but the heating and stirring were continued for approximately 10 hours. Thereafter 73 parts of this reaction mixture and 36 parts of tetrahydrofurane were poured together into 500 parts of water containing 28.5 parts of sodium bicarbonate. A clear solution was obtained. To 103 parts of this solution there were added 2 parts of sodium chloride.

An oily layer separated which, upon drawing off and weighing, comprised about 24.5 parts of of an oily mass containing approximately 50% water. A 10% solution of this oily layer as separated when dissolved in distilled water remained clear after several weeks storage at room temperature.

*Example 8*

51.4 parts of the oily layer obtained according to the method described in Example 7 were reacted with 0.26 parts of water dissolved in 10 parts dioxane, the solution being heated to 120° C. Thereafter 24.5 parts of the reaction product were dissolved in 19.0 parts of tetrahydrofurane and the solution admixed with a saturated aqueous solution of sodium bicarbonate. A viscous layer separated from the aqueous solution which comprised about 35 parts by weight of the mass and which layer contained approximately 30% of water. A 10% aqueous solution of this viscous layer as dissolved in distilled water while turbid at first, after a few days formed a clear solution. After six weeks storage at room temperature, the solution became somewhat turbid again, but was homogeneous.

*Example 9*

23.7 parts by weight of the product obtained by reacting γ-acetoxypropylmethyldichlorosilane and chlorosulphonic acid as described in Example 6 were equilibrated with the siloxane, the latter having the Formula D given in the above description in which $n=31.1$ and $m=0.67$, and having been obtained by hydrolysis of dimethyldichlorosilane and an aqueous solution of sulfuric acid. 13.8 parts by weight of the resultant product were dissolved in 6.9 parts of dioxane, and thereafter neutralized by the addition of aqueous ammonia (10% $NH_3$ dissolved in distilled water). Two layers were formed, the lower layer comprising the organo-silicon substance, and containing approximately 24 parts by weight of the organo-silicon compound and 55 parts of water. A 10% aqueous solution of the separated organo-silicon substance dissolved in distilled water formed a clear and stable solution.

*Example 10*

699 parts of freshly distilled chlorosulphonic acid were added dropwise while stirring to 1291 parts by weight of γ-acetoxypropylmethyldichlorosilane which was heated to a temperature of 85° C., under a vacuum of 30 mm. Hg. During admixing of the substances, nitrogen gas was passed into the solution at the rate of about 10 litres of nitrogen per mol of the silane per hour. The acetyl chloride and hydrogen chloride gaseous reaction products produced during the reaction were drawn off and condensed. Upon completion of the reaction and cooling to room temperature (20° C.) 1297 parts of a substantially colorless viscous liquid were recovered. 242 parts of the obtained reaction product were dissolved in 200 parts of dioxane. To this solution a mixture of 297 parts of n-octyl alcohol and 345 parts of a 29.8% solution of monoethylamine dissolved in dioxane were added during a period of 1 hour at room temperature while stirring. Thereafter the solution was filtered to separate the amine salts, after which the solution was evaporated to remove the solvent. There was then recovered approximately 560 parts of a viscous slightly yellow colored substance which contains some dissolved aminehydrochloride.

This reaction product could be used without further refining, or if desired, purified by dissolving the same in hexane, and then filtering and evaporating the hexane solvent. The product was readily soluble in water and foamed strongly in aqueous solutions.

*Example 11*

240 parts of the viscous reaction product of Example 10 were dissolved in a mixture of 295 parts of n-octyl alcohol and 200 parts of dioxane. The solution was stirred continuously while dry ammonia gas was introduced into the solution until the solution was rendered alkaline. The resultant product was filtered to separate ammonium salts and the solvent evaporated to recover approximately 546 parts of a soft, slightly yellow mass which dissolved readily in water.

*Example 12*

To a mixture consisting of 200 parts of the viscous reaction product of Example 10, and 200 parts of dioxane and 245 parts of n-octyl alcohol, there were added while stirring 393 parts of a 50.6% solution consisting of triethylamine dissolved in dioxane. After removing the amine salt by filtering and evaporating the solvent, as described in Example 10, approximately 491 parts of a viscous oily reaction product were recovered which was readily soluble in water.

*Example 13*

To a mixture consisting of 258 parts of n-octyl alcohol and 209 parts of triethylamine there were added dropwise while stirring, 207 parts of the viscous reaction product of Example 10, the latter being dissolved in 400 parts of dioxane.

After the major portion of the viscous reaction product had been added, the resultant solution was heated to 40° C. After the reaction was completed, the reaction mixture was filtered to separate out the amine salts and the solvent evaporated. A yield of 420 parts of a viscous water-soluble oily product was recovered. The surface tension of this oily product in a 1% aqueous solution was found to be 25 dyn. cm.$^{-1}$ (20° C.) and in a 0.1% aqueous solution was 39 dyn. cm.$^{-1}$ when tested under the same conditions.

*Example 14*

Example 10 was repeated using n-propanol instead of n-octyl alcohol, the process being carried out as described using monoethylamine dissolved in dioxane. The resultant reaction product was an oily liquid soluble in water. The surface tension values as determined for 1% and 0.1% aqueous solutions were 32 and 47 dyn. cm.$^{-1}$ (20° C.) respectively.

*Example 15*

Example 10 was repeated using n-butanol instead of n-octyl alcohol, the process being carried out as described using triethylamine instead of the monoethylamine. The resultant reaction product was an oily liquid which was readily soluble in water. The surface tension values as determined for 1% and 0.1% aqueous solutions were 30 and 34 dyn. cm.$^{-1}$ (20° C.), respectively.

*Example 16*

Example 10 was repeated using cyclohexanol instead of n-octyl alcohol, the process being carried out as described using triethylamine instead of the monoethylamine. The resultant reaction product was an oily liquid soluble in water. The surface tension values as determined for 1% and 0.1% aqueous solutions were 34 and 51 dyn. cm.$^{-1}$ (20° C.), respectively.

*Example 17*

To 46.9 parts of the oily reaction product produced as described in Example 10, there were added 51.4 parts of a siloxane of the general formula:

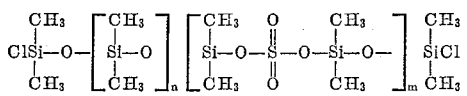

where $n=18.5$ and $m=0.6$.

After heating and stirring the mixture at 100° C. for 16 hours, a homogeneous, equilibrated mixture was obtained. The resultant solution, consisting of 30.3 parts by weight of this product and 15.2 parts of dioxane, was added dropwise to a solution consisting of 11.2 parts of isopropylamine and 38 parts of ethanol.

The reaction mixture was treated under reflux with a solution of 0.8 part of water and 7.2 parts of ethanol. Upon completion of the reaction, the solution was filtered. Approximately 5.8 parts by weight amine salts separated, there remaining 34.9 parts by weight of a viscous, oily residue which is a water-soluble product.

*Example 18*

To 178.5 parts of the oily reaction product of Example 10, there were added 307.5 parts of siloxane of the composition set forth in Example 17. An equilibrated homogeneous mixture was produced by heating this mixture to 100° C. while stirring the same for 10 hours. Thereafter 86.6 parts of the resultant homogeneous mixture was mixed with 43.3 parts of dioxane and added to a solution consisting of 69.3 parts of a 29.87% solution of monoethylamine in dioxane and 15.4 parts methanol. After filtering off 26.1 parts of the amine salts and evaporating the solvent, as hereinbefore described, 79 parts of a residue remained. 19.1 parts of this residue were mixed with 1.6 parts of a 30% solution of triethylamine in dioxane, and a solution of 0.48 part of water and 4.3 parts of dioxane was added to the mixture.

The resultant mixture was heated for 3 to 4 hours under a reflux condenser, and then the solvent distilled. After distillation of the solvent, 18.9 parts of a viscous oily substance was obtained. Aqueous solutions containing 10% and 30% respectively of this viscous oily substance form stable solutions.

*Example 19*

35.5 parts by weight of the viscous oily product described in Example 18 was dissolved in 18 parts of tetrahydrofurane. The resultant solution was added dropwise, over a period of ½ hour into a solution consisting of 5 parts of sodium methylate suspended in 18 parts of tetrahydrofurane. After filtrating the resultant mixture and evaporating the solvent, 37.1 parts by weight of a turbid highly viscous mass were recovered. A 4% aqueous solution of this highly viscous mass formed a clear solution but later became turbid and had a pH value of 4.5 after 3 days. The solution, however, remained in stable condition over a period of three to four weeks and showed no tendency to separate oil droplets.

*Example 20*

Example 17 was repeated, with the difference that for each 10.4 parts by weight of the reaction product of acetoxypropylmethyldichlorosilane and chlorosulphonic acid, there were present 56.6 parts by weight of siloxane.

To 25.8 parts of the product of the resultant reaction there was added an equal part of dioxane, and to this solution there was added 5 parts of isopropylamine and 37.2 parts of a polyethylene-glycolmonomethylether (molecular weight 440). After filtering and removing the solvent as hereinbefore described, there was recovered 599 parts of an oily mass which was readily dissolved in water forming stable solutions.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

Having thus described the invention, what is claimed as new and desired to be secured by Letters Patent is:

1. A method of preparing organo-silicon compounds having sulphate ester groups bound to silicon atoms by carbon bonds which comprises reacting an organo-silicon compound of the general formula $$R_xY_ySi(MOCOR)_{4-(x+y)}$$

wherein R represents a monovalent hydrocarbon radical selected from the group consisting of alkyl, aryl, aralkyl, alkaryl and combinations of such radicals, Y represents a member selected from the group consisting of halogen atoms and alkoxy radicals, M represents a divalent hydrocarbon radical, the terminal groups of said divalent hydrocarbon radical being separated by at least one additional carbon atom and $x$ and $y$ are numbers having values between 0 and 3, the sum of $x+y$ being 3, with a sulphating agent which is a member selected from the group consisting of sulphuric acid, $SO_3$, amidosulphonic acid and chlorosulfonic acid at a temperature of up to 180° C., and recovering the sulphate-ester groups containing organo-silicon compound thus formed.

2. Method according to claim 1, wherein said organo-silicon compound is a member selected from the group consisting of γ-acetoxypropyl methyl dichlorosilane, γ-propionoxypropyl trichlorosilane and δ-acetoxy butyl ethyl dichlorosilane.

3. A method according to claim 1, wherein R represents an alkyl radical having up to 4 carbon atoms, M represents a member selected from the group consisting of n-propylene, 3-chloropropylene, 1,3-n-butylene, and isobutylene radicals and Y stands for chlorine.

4. A method according to claim 1, wherein said reaction is carried out at reduced pressure at a temperature of from about 30 to 140° C., said sulphating agent being chlorosulphonic acid.

5. A method according to claim 1, wherein the sulphating agent is chlorosulphonic acid and the sulphate-ester group containing organo-silicon compound is thereafter reacted with a member selected from the group consisting of monohydric and polyhydric aliphatic and aromatic alcohols and mixtures thereof, and neutralizing the free acid formed in said reaction.

6. A method according to claim 1, wherein the sulphating agent is chlorosulphonic acid and the sulphate-ester group containing organo-silicon compound is thereafter reacted with an organo-siloxane selected from the group of organo-siloxanes consisting of compounds having the following formulae:

(1) 

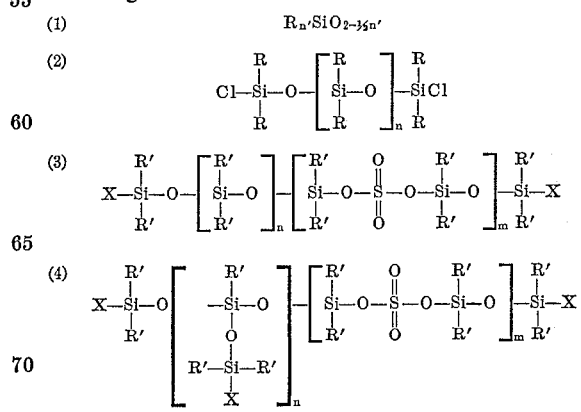

wherein R' represents a monovalent radical selected from the group consisting of alkyl, aryl, aralkyl, alkaryl, hydrogen and combinations of such radicals, X is a member selected from the group consisting of halogen and alkoxy, $n$ and $m$ are numbers and $n'$ is a number having values between 1 and 3, until equilibrium is reached, hydrolyzing the reaction product of said equilibration reaction and neutralizing the free acid formed in said reaction with a member selected from the group consisting of amine and ammonia.

7. Composition of matter obtained by reacting an organo-silicon compound having the general formula $$R_xY_ySi(MOCOR)_{4-(x+y)}$$

wherein R represents a monovalent hydrocarbon radical selected from the group consisting of alkyl, aryl, aralkyl, alkaryl and combinations of such radicals, Y represents a member selected from the group consisting of halogen atoms and alkoxy radicals, M represents a divalent hydrocarbon radical, the terminal groups of said divalent hydrocarbon radical being separated by at least one additional carbon atom and $x$ and $y$ are numbers having values between 0 and 3, the sum of $x+y$ being 3, with a sulphating agent which is a member selected from the group consisting of sulphuric acid, $SO_3$, amido-sulphonic acid and chlorosulphonic acid at a temperature of up to 180° C.

8. Composition of matter according to claim 7, wherein the sulphating agent is chlorosulphonic acid and the sulphate-ester group containing organo-silicon compound is thereafter reacted with an organo-siloxane selected from the group of organo-siloxanes consisting of compounds having the following formulae:

(1) $R_{n'}SiO_{2-\frac{1}{2}n'}$ (2) 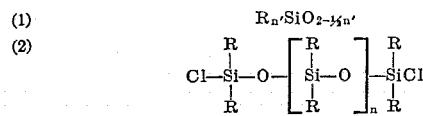

(3) 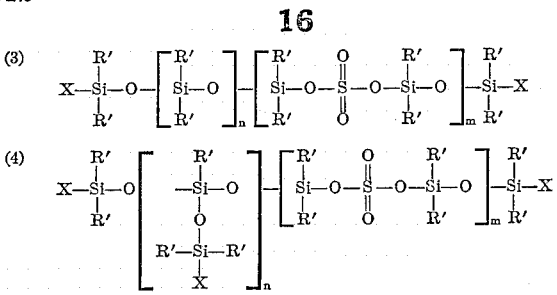

(4)

wherein R' represents a monovalent radical selected from the group consisting of alkyl, aryl, aralkyl, alkaryl, hydrogen and combinations of such radicals, X is a member selected from the group consisting of halogen and alkoxy, $n$ and $m$ are numbers and $n'$ is a number having values between 1 and 3, until equilibrium is reached, and finally reacting the reaction product with a mixture which is selected from the group consisting of mixtures of alcohol and amine, water and amine, alcohol and ammonia, water and ammonia and mixtures of these mixtures.

References Cited in the file of this patent
UNITED STATES PATENTS

| | | |
|---|---|---|
| 2,582,569 | Speier | Jan. 15, 1952 |
| 2,770,633 | Sommer | Nov. 13, 1956 |
| 2,922,806 | Merker | Jan. 26, 1960 |
| 2,922,807 | Merker | Jan. 26, 1960 |
| 2,955,128 | Bailey | Oct. 4, 1960 |
| 2,968,643 | Bailey | Jan. 17, 1961 |

OTHER REFERENCES

Schmidt et al.: "Angwandte Chemi," volume 70 (1958), pages 469–70, 657.